(12) United States Patent
Fanucci et al.

(10) Patent No.: US 8,053,068 B2
(45) Date of Patent: Nov. 8, 2011

(54) SHAPE MEMORY ALLOY COMPOSITE MATERIAL SHOCK AND VIBRATION ISOLATOR DEVICES

(75) Inventors: Jerome P. Fanucci, Lexington, MA (US); Pavel Bystricky, Lexington, MA (US)

(73) Assignee: Kazak Composites, Incorporated, Woburn, MA (US)

( * ) Notice: Subject to any disclaimer, the term of this patent is extended or adjusted under 35 U.S.C. 154(b) by 453 days.

(21) Appl. No.: 12/080,090

(22) Filed: Mar. 31, 2008

(65) Prior Publication Data

US 2009/0126288 A1    May 21, 2009

Related U.S. Application Data

(60) Provisional application No. 60/920,765, filed on Mar. 29, 2007.

(51) Int. Cl.
*D04H 1/00* (2006.01)
(52) U.S. Cl. ............... 428/292.1; 428/293.1; 428/297.6
(58) Field of Classification Search ............... 428/295.1, 428/913, 297.4, 300.1, 408, 292.1, 293.1
See application file for complete search history.

(56) References Cited

U.S. PATENT DOCUMENTS

| | | | | |
|---|---|---|---|---|
| 1,199,249 | A * | 9/1916 | Dew | 442/149 |
| 6,872,433 | B2 * | 3/2005 | Seward et al. | 428/36.9 |
| 7,601,160 | B2 * | 10/2009 | Richter | 606/139 |
| 7,621,940 | B2 * | 11/2009 | Harms et al. | 606/257 |
| 7,665,330 | B2 * | 2/2010 | Nakajima | 65/33.8 |
| 7,833,256 | B2 * | 11/2010 | Biedermann et al. | 606/300 |
| 2002/0142119 | A1 * | 10/2002 | Seward et al. | 428/36.9 |
| 2004/0025186 | A1 * | 2/2004 | Jennings et al. | 725/93 |
| 2006/0201149 | A1 * | 9/2006 | Biggs et al. | 60/527 |
| 2009/0043373 | A1 * | 2/2009 | Arnault De La Menardiere et al. | 623/1.15 |
| 2010/0229610 | A1 * | 9/2010 | Garrigan et al. | 70/174 |

* cited by examiner

*Primary Examiner* — N. Edwards
(74) *Attorney, Agent, or Firm* — Weingarten, Schurgin, Gagnebin & Lebovici, LLP (57) ABSTRACT

A shock and vibration isolator device has one or more connecting elements of a superelastic shape memory alloy composite material extending between a base member, configured to mount to a structure or ground, and a mounting member, configured to support equipment or machinery. The superelastic shape memory alloy composite material is formed of a plurality of superelastic wires embedded in an elastomeric matrix material.

5 Claims, 13 Drawing Sheets

SHAPE MEMORY ALLOY COMPOSITE MATERIAL SHOCK AND VIBRATION ISOLATOR DEVICES

CROSS REFERENCE TO RELATED APPLICATIONS

This application claims the benefit under 35 U.S.C. §119 (e) of U.S. Provisional Patent Application No. 60/920,765, filed Mar. 29, 2007, the disclosure of which is incorporated by reference herein.

STATEMENT REGARDING FEDERALLY SPONSORED RESEARCH OR DEVELOPMENT

This invention was developed under Navy Contract No. N6553806M0124. The Government may have certain rights in this invention.

BACKGROUND OF THE INVENTION

Shape memory alloys (SMA) are materials that can undergo large deformations and return to their original undeformed shape through either the shape memory effect or the superelastic effect. Shape memory alloys are able to undergo these deformations because of the reversible diffusionless detwinning process they undergo when deformed. This solid-solid phase change is called martensitic transformation. The critical temperature which defines when the transformation occurs depends on the composition and thermomechanical processing of the alloy. Alloys can thus be tailored such that the critical temperature falls either above or below room temperature, and typically in a range between −150° C. and +200° C. Shape memory alloys usually refer to alloys with a higher than ambient critical temperature. SMAs thus require the input of heat in order to recover the original (or "memorized") shape which existed prior to deformation. Superelastic shape memory alloys possess a lower critical temperature and are therefore associated with the superelastic effect which requires only the removal of stress on the material in order to recover the deformation. SMA materials are costly and are available commercially primarily in fine wire form.

SUMMARY OF THE INVENTION

A shock and vibration isolator device is provided that incorporates shape memory alloys (SMAs). SMAs, and in particular superelastic materials, which share the hysteretic behavior of conventional SMAs but do not require the application of heat to recover their initial shape, provide the combination of large elastic strain capability, excellent low and high cycle fatigue, excellent corrosion resistance, and high non-frequency or non-amplitude dependent energy dissipation per unit mass of material.

In one embodiment, a shock and vibration isolator device comprises a base member, configured to mount to a structure or ground, and a mounting member, configured to support equipment or machinery. At least one connecting member is connected between the base member and the mounting member. The connecting member comprises a composite material comprising wires of a superelastic shape memory alloy embedded in an elastomeric matrix material. In one embodiment, the connecting members are a number of strips extending in at least two orthogonal directions between the base member and the mounting member. In another embodiment, the connecting member is a dome extending between the base member and the mounting member. A number of isolator devices can be stacked to provide a variety of frequency responses.

In still further embodiments, the SMA composite material is incorporated into a seismic brace for structures and into a column wrap for blast and seismic protection.

A single isolator device is suitable to isolate both short duration, high amplitude shock loads, such as from seismic events or blasts, and higher frequency, constant duration vibrational loads. The device is able to utilize SMA materials in the commercially available fine wire form.

DESCRIPTION OF THE DRAWINGS

The invention will be more fully understood from the following detailed description taken in conjunction with the accompanying drawing in which.

DETAILED DESCRIPTION OF THE INVENTION

Figure 1:
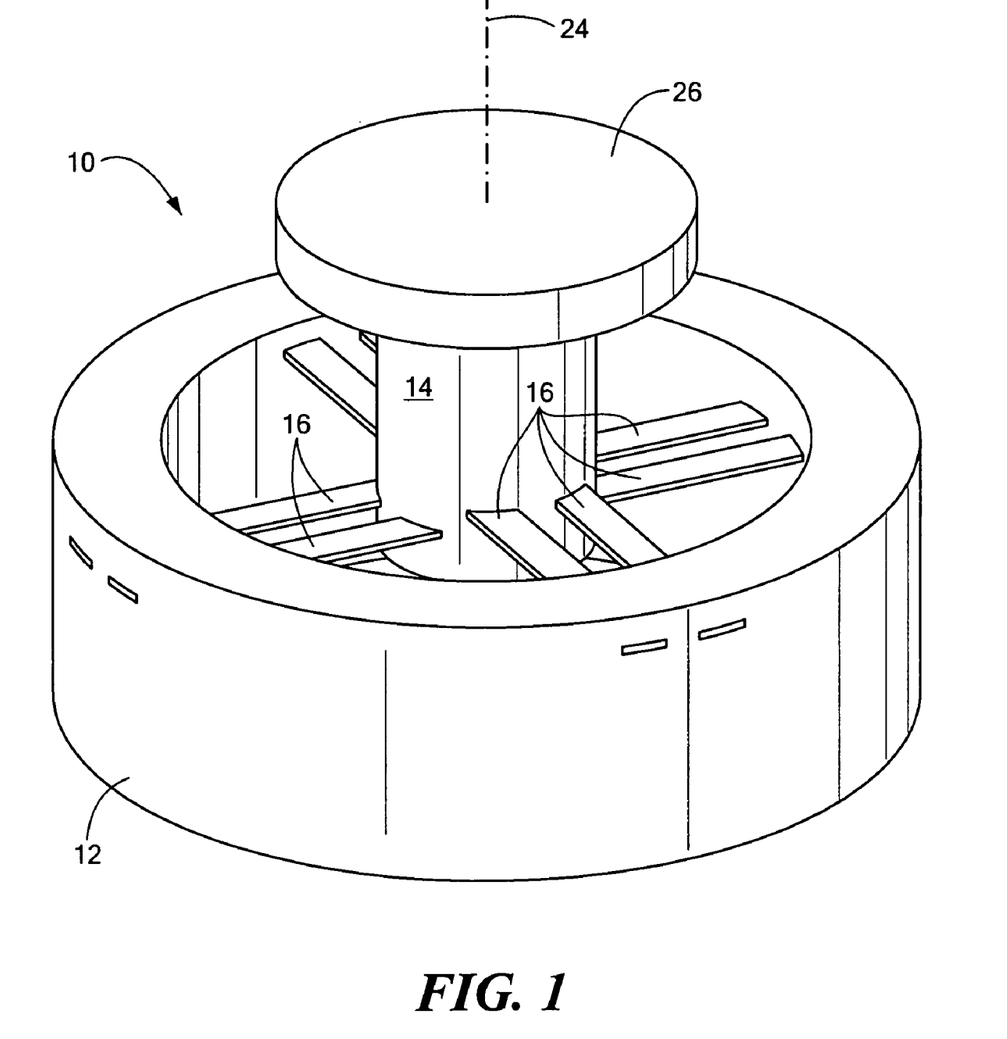
FIG. 1 is a schematic illustration of one embodiment of a shock and vibration isolator device according to the invention.

Referring to FIG. 1, one embodiment of an isolator device 10 is illustrated, having an outer base member 12 and an inner mounting member 14. One or more connecting members 16 extend between the base member and the mounting member. The base member 12 can be mounted in any suitable manner to a structure or ground. Equipment or machinery can be mounted to the mounting member 14. The connecting member or members 16 isolate the equipment from shock or vibrations transmitted through the structure or ground to the base member. The base member 12 can have any suitable configuration and fastening fixtures to mount to the structure or ground. Similarly, the mounting member 14 can have any suitable configuration and fastening fixtures to support any desired type of equipment or machinery.

Figure 2:
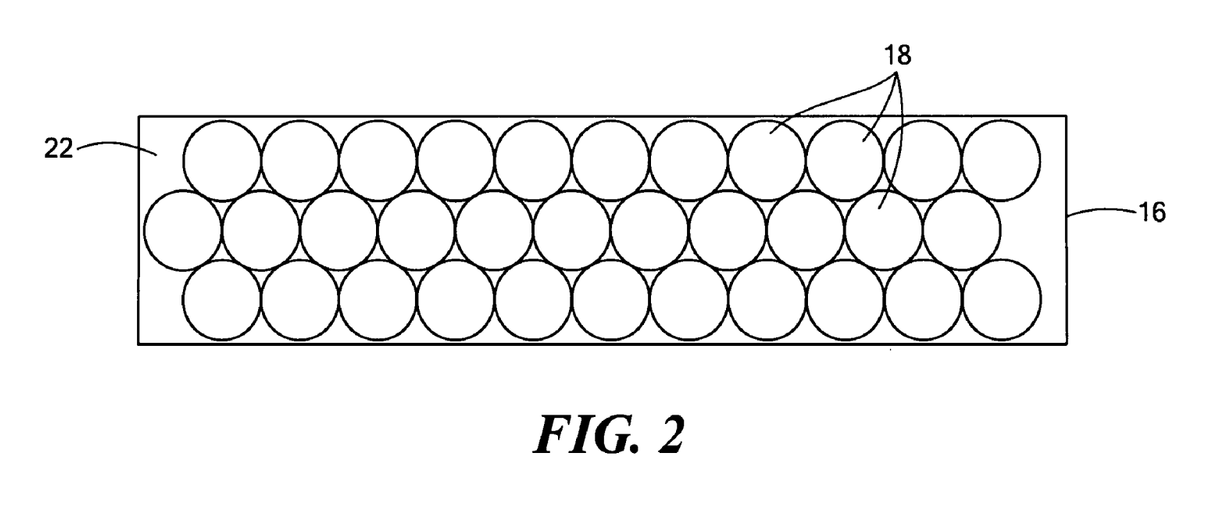
FIG. 2 is a schematic cross-sectional view of a connecting member of the isolator device of FIG. 1, illustrating one wire arrangement.

The connecting member 16 is formed from a shape memory alloy composite material. More particularly, structural elements 18 such as wires or rods formed of a shape memory alloy material, preferably a superelastic SMA, are embedded in an elastomeric matrix material 22 to form an SMA composite material. See FIG. 2. This composite material is suitably configured to form the connecting member(s) between the base member and the mounting member. The primary load path between the base member and the mounting member is through the SMA structural elements rather than through the matrix material of the connecting member. The loads on the isolator device may be applied in any direction, for example, axial or radially. When a dynamic or cyclic input load, such as a shock or vibration, is transmitted to the base member, the SMA structural elements in the connecting member deform, dissipating the input energy and isolating the mounting member from the shock or vibrational input load. Similarly, vibrations generated by the equipment can be isolated from transmission to the supporting structure or ground. The frequency response of the isolator device can be further tuned by altering the volume ratio of SMA to matrix material and the geometry of the connecting elements, depending on the application.

Unique re-centering capabilities (re-centering force due to nearly zero residual strain upon unloading) along with high damping characteristics (from hysteresis) are associated with shape memory and superelasticity. In particular, SMAs have the ability to dissipate significant energy through repeated cycling without significant degradation or permanent deformation. Their usable elastic strain range is typically on the order of 7-9%, which provides them with very high energy dissipation per unit mass of material. They exhibit strain hardening at large strain levels, hysteretic damping, and a stress plateau, which can limit force transfer to other parts of a structure. SMAs have excellent low and high cycle fatigue properties, and excellent corrosion resistance. The hysteretic damping properties are largely amplitude and frequency independent, which is particularly useful for response to multi-frequency, variable amplitude earthquake ground motion.

A nickel/titanium alloy, such as Nitinol, is suitable for use as the SMA structural elements 18. Other SMA materials can also be used, such as nickel-titanium-niobium, copper-aluminum-nickel, and copper-zinc-aluminum-nickel alloys.

The matrix material 22 is formed of an elastomeric material that can return to its original shape after deformation. The confinement and deformation of the matrix material also provides some buckling constraint and further energy dissipation. The matrix material should be compatible with the high strain anticipated for the composite material, at least 6% and preferably in excess of the strain of the SMA structural elements. Most thermoset resins used in composites are limited in strain capacity, having typical strain to failure of the neat resins in the 2-6% range, with an elastic range of not more than 1-2%. Above this strain, considerable permanent damage to the matrix can lead to eventual matrix failure under cyclic loading. Thus, an elastomeric material with a strain capacity in excess of 6% is preferable.

The particular elastomer selected depends on various factors, such as cost, ease of manufacturing, compatibility with operating conditions (such as temperatures, presence of water, oils, fuel), and safety (such as outgassing of hazardous chemicals and behavior during fire, such as smoke toxicity, oxygen index, heat release, flame spread, and the like), as well as the mechanical performance of the elastomer. For some embodiments, the resin for the matrix should preferably be able to be processed in a pultrusion process, discussed further below. The matrix material should be able to perform across a wide temperature range with resistance to embrittlement at lower temperatures. Resistance to moisture and other environmental effects is also desirable.

The matrix material is preferably a thermoset elastomeric material and more preferably a polyurethane material. Several of these resins are based on polyether backbones, which give good hydrolytic resistance to the cured polyurethane.

One suitable matrix material is a polyurethane elastomer such as ADIPRENE® LF750D, available as a prepolymer resin from Crompton. Stiffness is about 6000-8000 psi. It is non-brittle to as low as −80° F. and has a strain to failure greater than 200%. After curing, this material is comparatively hard, about 55 to 70 Shore D, which helps in the transfer of loads from the surface of the matrix into the SMA wires. This material is also advantageous in having a longer pot life and lower viscosity, which is helpful in the manufacturing process. Also, it has excellent high temperature dynamic properties and low heat build-up due to hysteresis in high speed, high load bearing applications.

The prepolymers are formed by reaction of various isocyanates with other materials, usually mixtures of polyols. The isocyanates are usually toluene diisocyanate (TDI) or methylenediphenyl diisocyanate (MDI), although others can be used. Production of the prepolymer is usually done to produce a thermoset system in which the hazardous isocyanates are already reacted onto large, high molecular weight chains, which reduces subsequent workplace exposure to the isocyanate. The prepolymer can be further purified to reduce the free (unreacted) isocyanate to less than 0.1%.

Conversion of the prepolymer to a thermoset elastomer is accomplished by mixing with a curing agent, usually an aromatic diamine. A suitable curing agent for LF750D is Caytur 31, also available from Crompton. This allows a long, almost unlimited, room temperature pot life for the mixed resin, with rapid cure once the material is heated to temperatures above 220° F. The reactive ingredient in this curing agent is methylenedianiline (4,4' methylenedianiline or MDA). Other curing agents are available and can be used.

Another suitable resin is ADIPRENE® L100. The neat resin has a strain to failure of 600-1000W. A highly fire resistant formulation of this resin is available. Elastomeric properties are maintained down to −100° F., although the hardness and modulus of the resin rise considerably under cold conditions. Its hardness is 85-90 Shore A. This resin has a lower hardness and elastic modulus at room temperature than LF 750D, however, so external loads may not be as effectively transmitted from the outer urethane surface into the SMA wires.

In one embodiment, the base member 12 and the mounting member 14 are coaxial. See FIG. 1. The base member is annular, defining a central axis 24, and having an inner surface, and the mounting member is disposed coaxially along the central axis 24. The mounting member is columnar and includes a surface or fixture 26 to which equipment or machinery can be mounted in any suitable manner. The connecting members 16 are elongated strips that bridge the space between the inner surface of the base member and the mounting member in at least two orthogonal directions.

Figure 3:
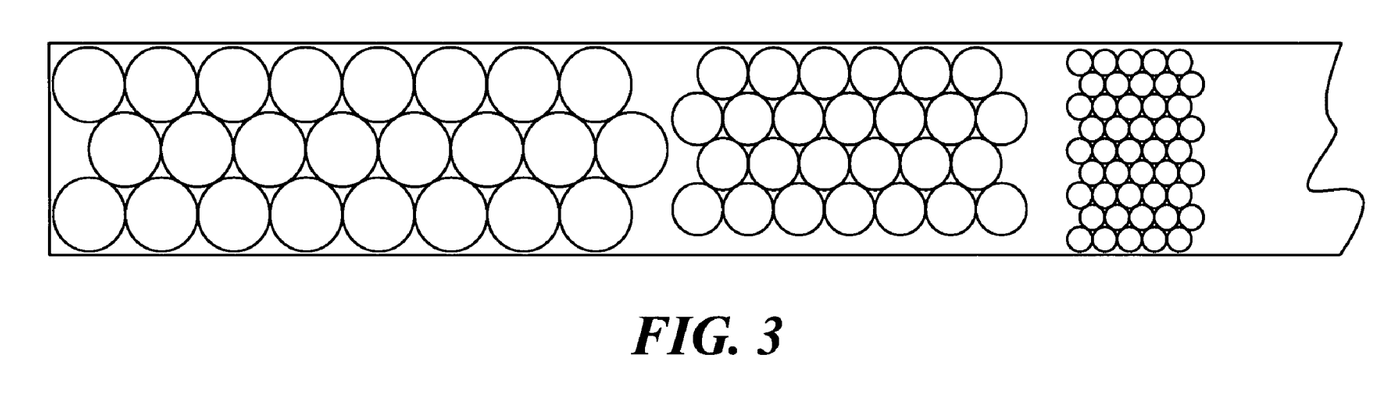
FIG. 3 is a cross-sectional view schematically illustrating three wire arrangements.
Figure 4A:
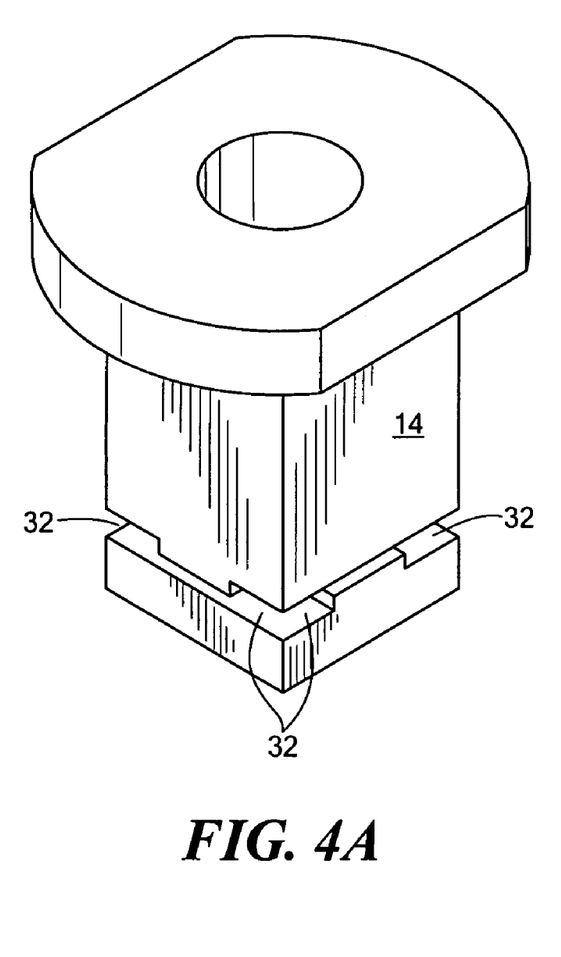
FIG. 4A is a perspective view of a mounting member.
Figure 4B:
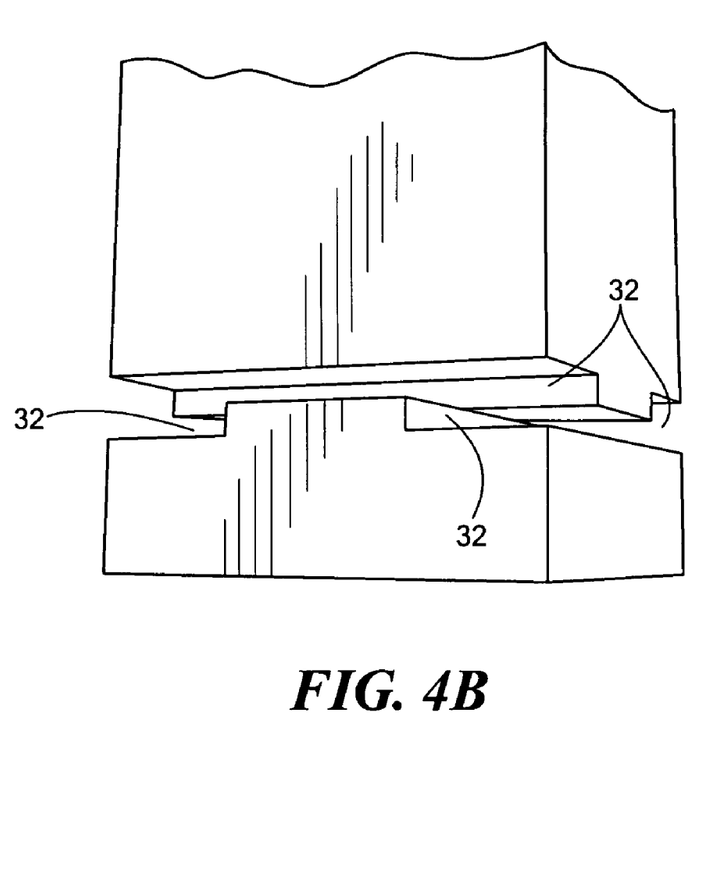
FIG. 4B is a further perspective view of the mounting member of FIG. 4A.
Figure 5A:
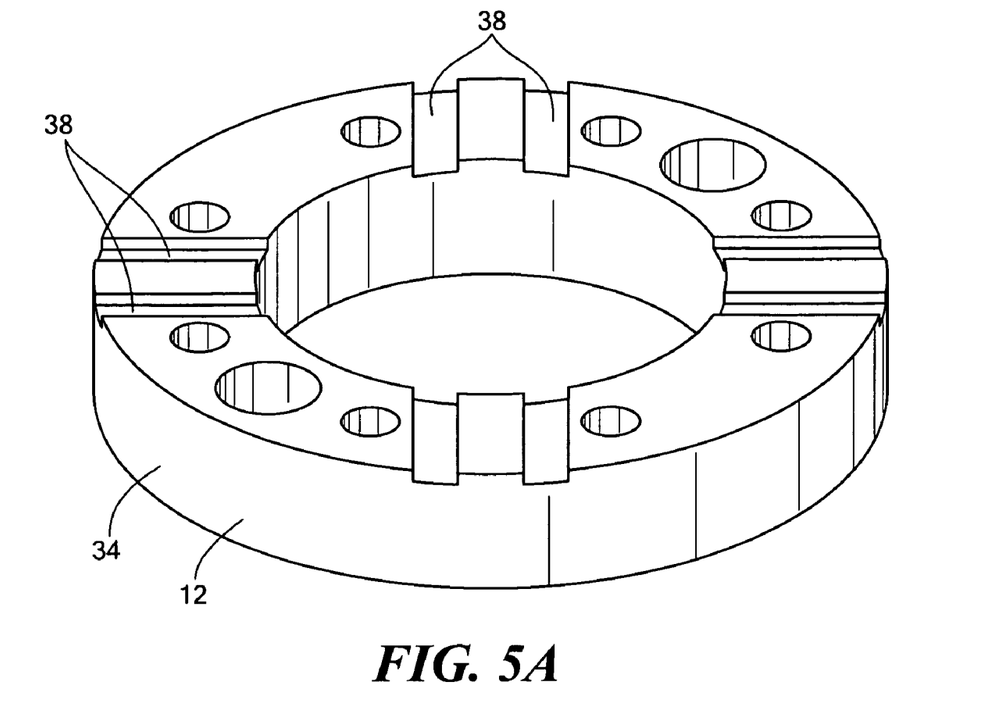
FIG. 5A is a perspective view illustrating a lower ring of a base member.
Figure 5B:
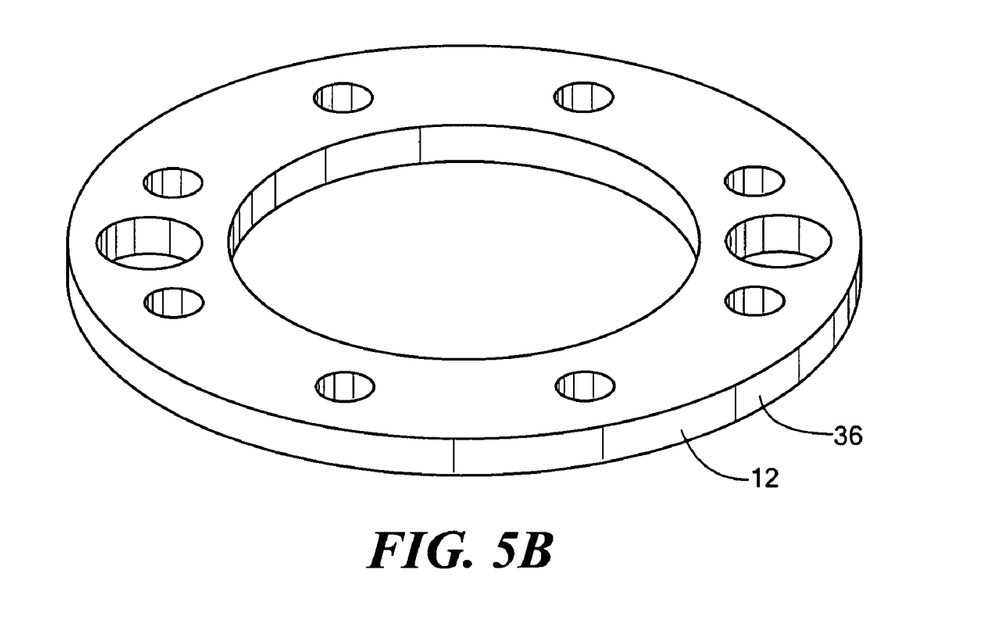
FIG. 5B is a perspective view illustrating an upper ring of the base member.
Figure 6:
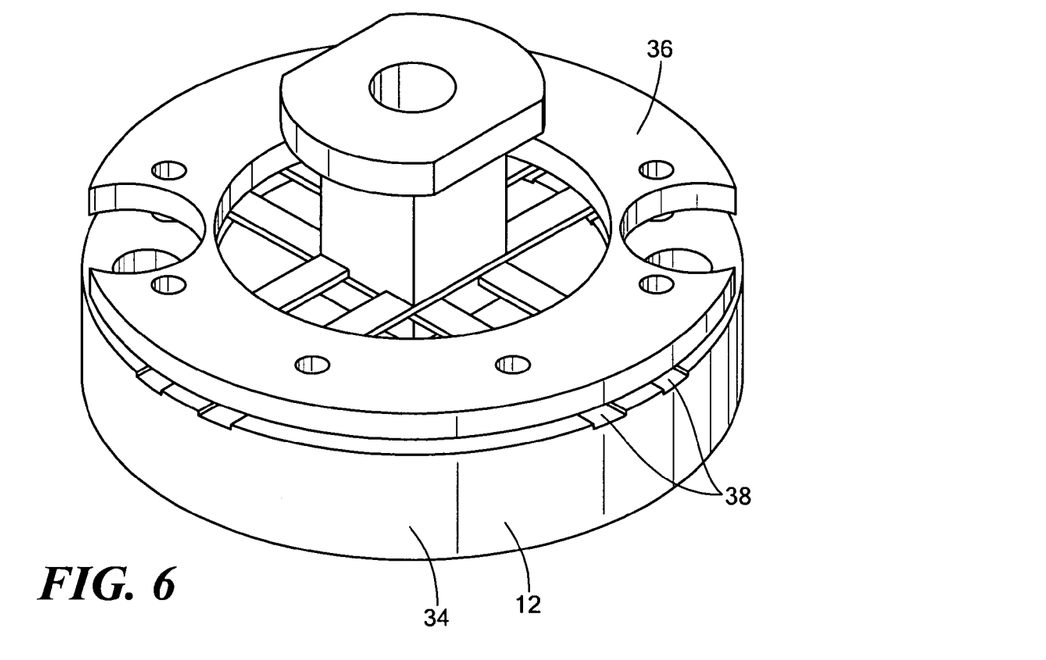
FIG. 6 is an isometric view of the isolator device incorporating the mounting member and base member of FIGS. 4A-5B.

Each connecting member is a strip of rectangular cross-section and includes a plurality of generally parallel SMA wires 18 embedded in the matrix material 22. See FIG. 2. The wires can be closely packed or aligned in an array of rows and columns when viewed in cross-section. The array can include any desired number of rows and columns, depending on the size of the isolator device and the particular application. Any size diameter of wire can be used, depending on the application. See, for example, FIG. 3, which schematically illustrates three sizes of wire.

The connecting members 16 can be affixed to the base member 12 and to the mounting member 14 in any suitable manner. Referring to FIGS. 4A-6, in one embodiment, the mounting member 16 includes orthogonal slots 32 machined therein. See FIGS. 4A and 4B. The connecting members pass through the slots from one interior side of the base member 12 to the opposite interior side. In the embodiment shown, two sets of slots are provided in each direction. The base member 12 is formed from two rings, a bottom ring 34 and a top ring 36, and the connecting members 16 are clamped between the rings, for example, with a number of bolts. See FIGS. 5A, 5B, 6. Grooves 38 may be machined into one of the rings (shown in the bottom ring) into which the connecting members fit securely. To improve the gripping of the connecting members, an adhesive, such as a cyanoacrylate, can be applied, or the surfaces of the grooves can be roughened in any suitable manner, such as with strips of silicon carbide paper.

Figure 7:
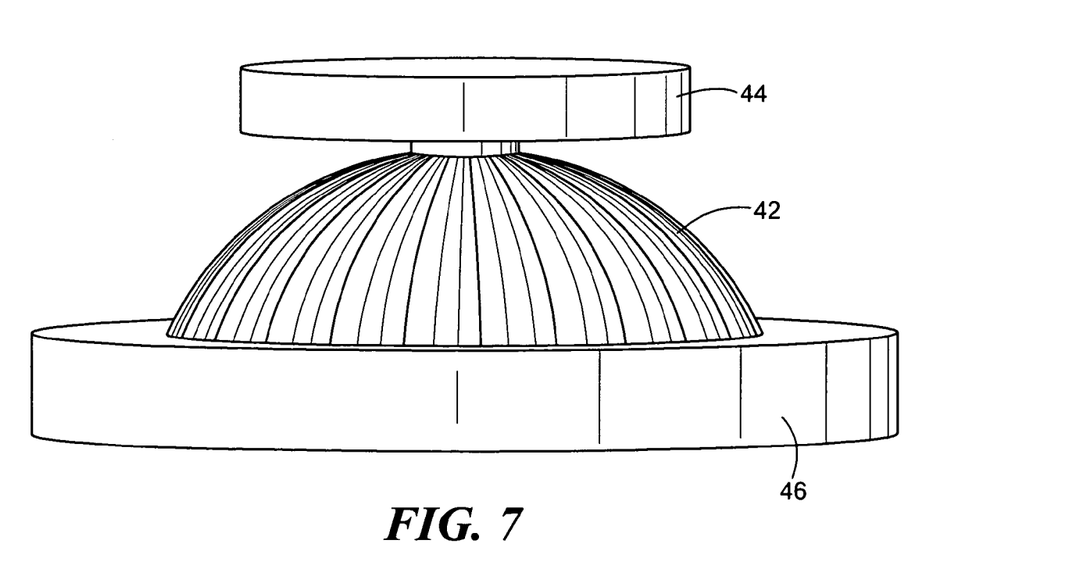
FIG. 7 is a schematic illustration of a further embodiment of a shock and vibration isolator device according to the invention.
Figure 8:
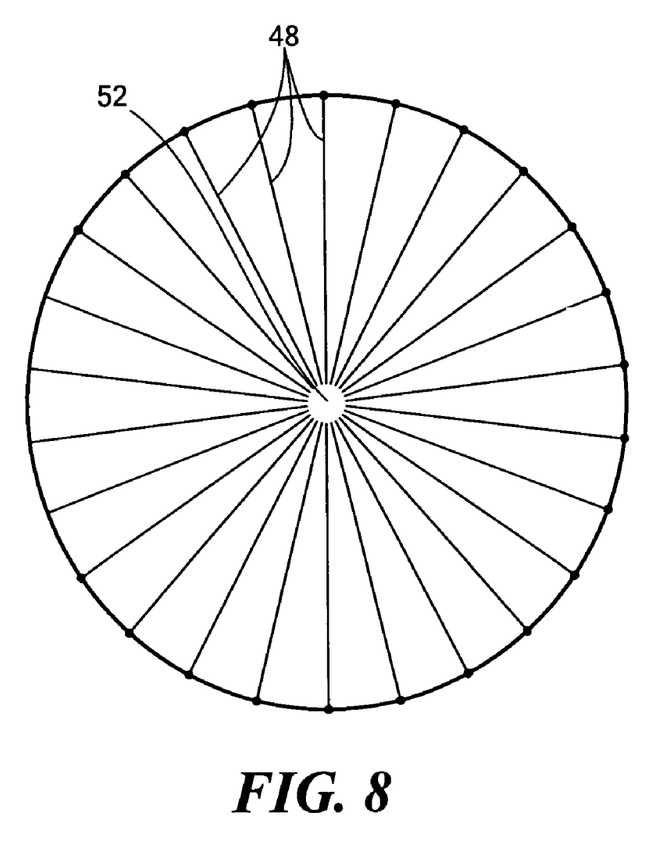
FIG. 8 is a schematic top view illustrating a dome with a radial wire arrangement for use with the isolator device of FIG. 7.
Figure 9:
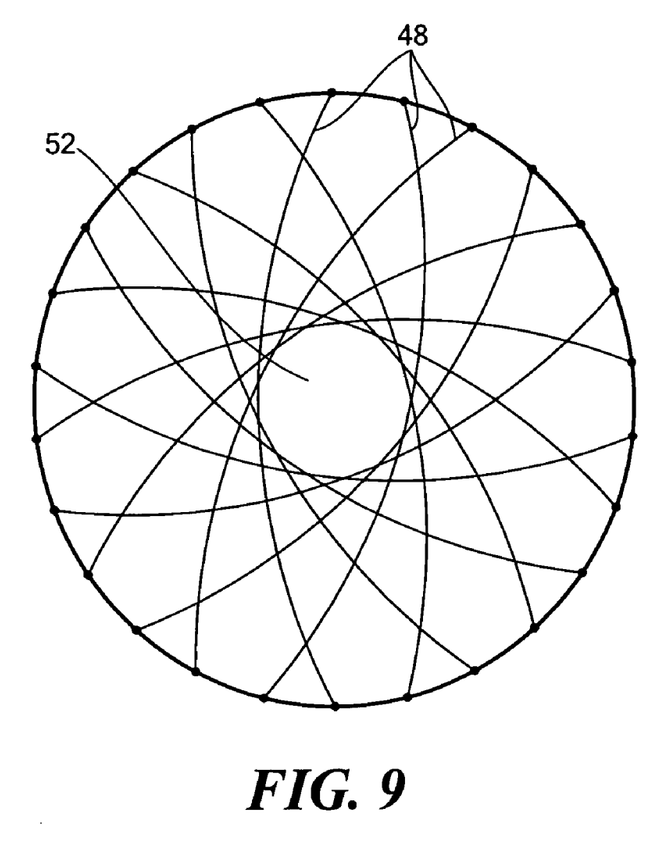
FIG. 9 is a schematic top view illustrating a dome with a curved wire arrangement for use with the isolator device of FIG. 7.

In another embodiment, the connecting member is in the form of a dome 42. See FIG. 7. A hole in the top center of the dome-shaped connecting member allows a fixture to pass through for fastening the connecting member to the mounting member 44. FIGS. 8 and 9 each represent a top view of an embodiment of dome 42. A number of SMA wires 48 are arranged in a desired configuration, such as the radial configuration illustrated in FIG. 8 or the curved arrangement illustrated in FIG. 9. With the arrangement of FIG. 9, the wires can extend from one side of the base member 46 to the other by curving around the central hole 52 for the fixture of the mounting member. The dome-shaped connecting member can be clamped between an upper ring and a lower ring of the base member. For example, the dome can be wrapped over the bottom ring, and the upper ring can be placed over the dome and the lower ring and fastened in place, such as with bolts.

Other configurations of the base and mounting member can be provided. For example, the mounting member could have an annular configuration, and the base member could be disposed axially within the annular mounting member.

Figure 10:
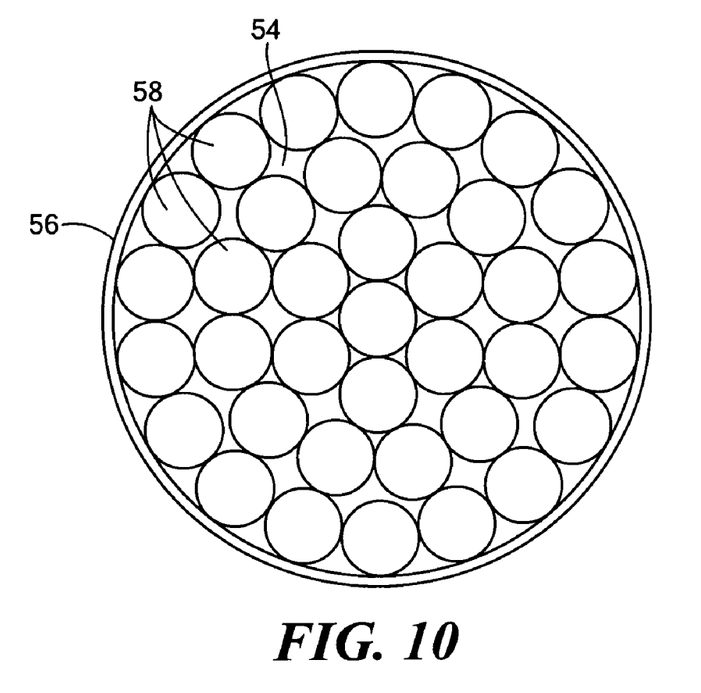
FIG. 10 is a schematic illustration of a wire arrangement for a circular SMA composite material.
Figure 11:
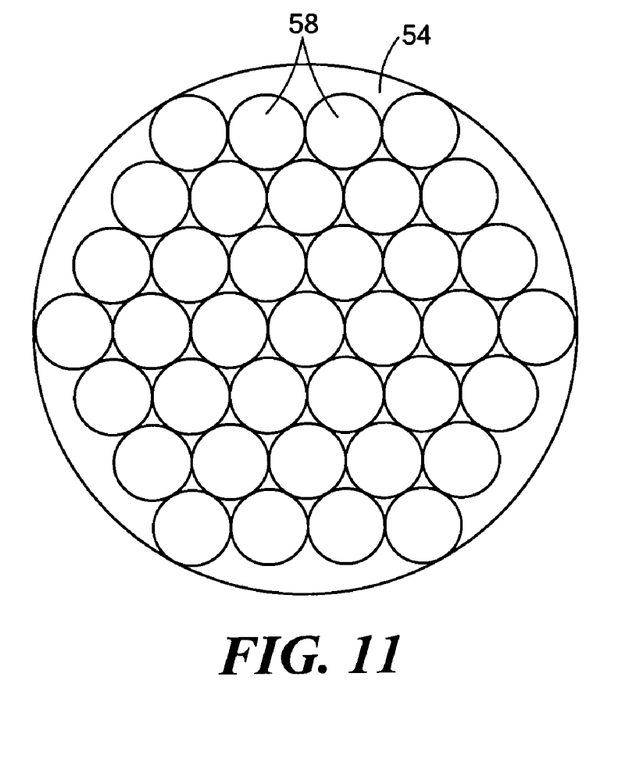
FIG. 11 is a schematic illustration of a close-packed wire arrangement for a circular SMA composite material.
Figure 12:
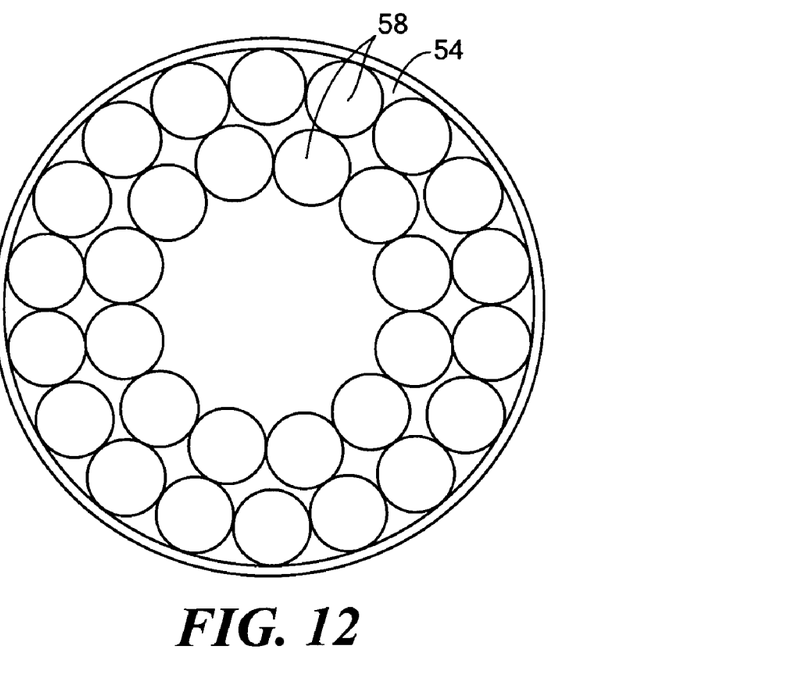
FIG. 12 is a schematic illustration of a wire arrangement with the center left free of wires.
Figure 13:
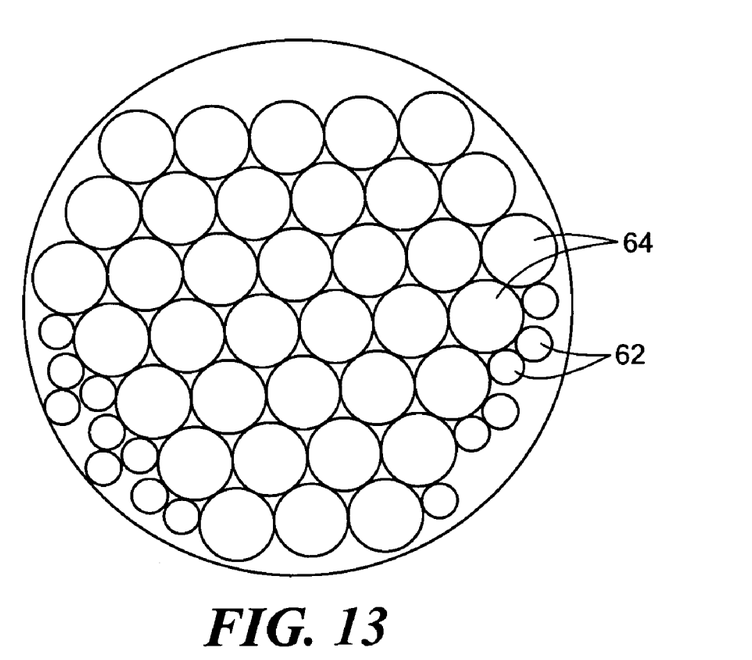
FIG. 13 is a schematic illustration of a wire arrangement incorporating larger and smaller diameter wires.
Figure 14:
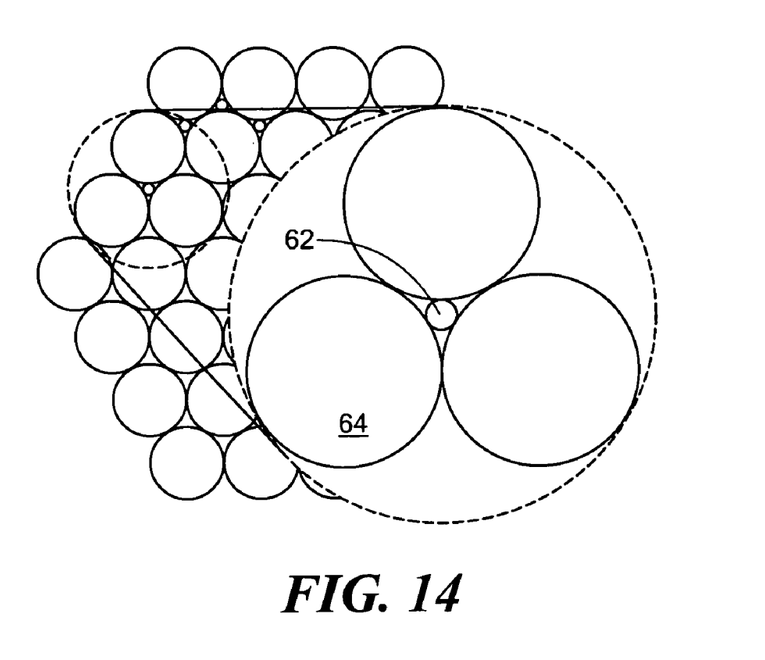
FIG. 14 is a schematic illustration of a wire arrangement incorporating smaller diameter wires in interstices between larger diameter wires.
Figure 15:
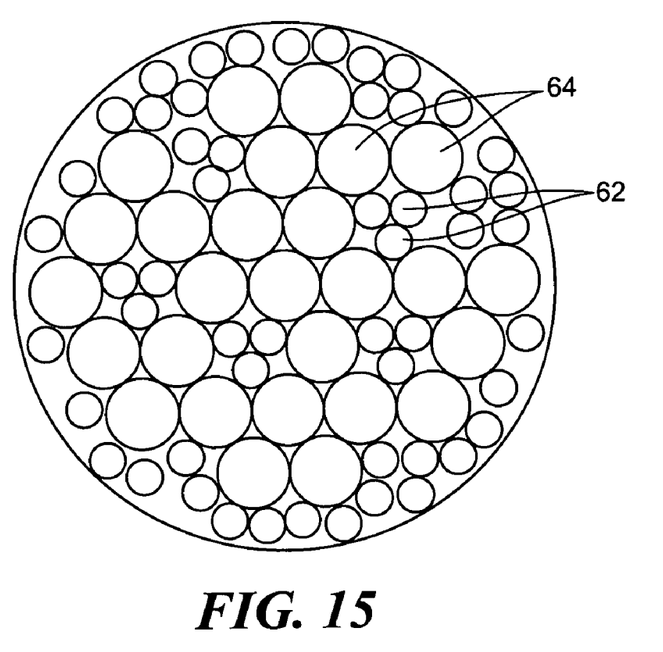
FIG. 15 is a schematic illustration of a further wire arrangement incorporating smaller diameter wires in interstices between larger diameter wires.
Figure 16A:
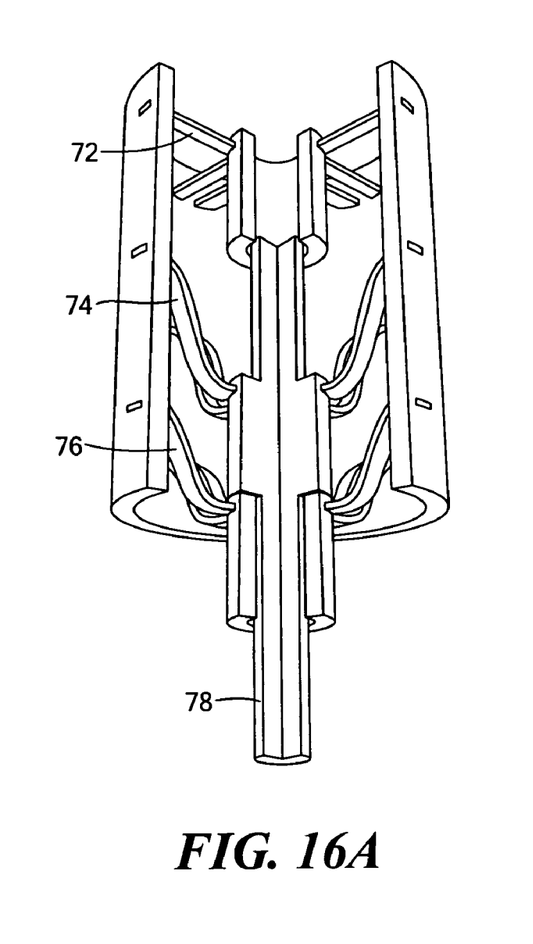
FIG. 16 is a schematic illustration of multiple isolator devices according to the invention.
Figure 16B:
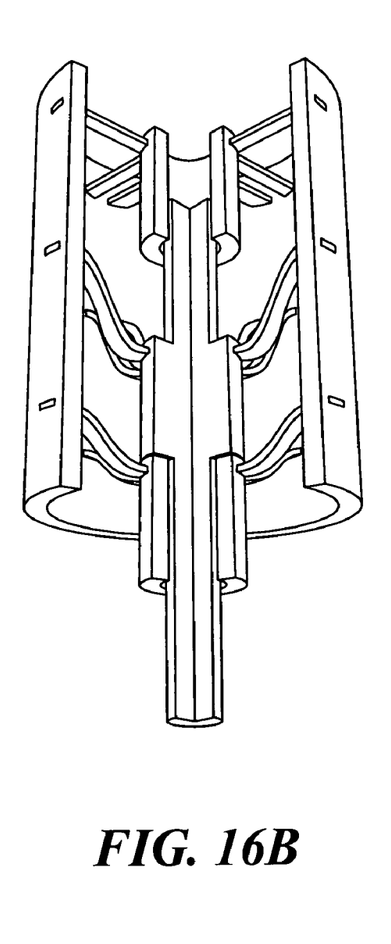
Figure 16C:
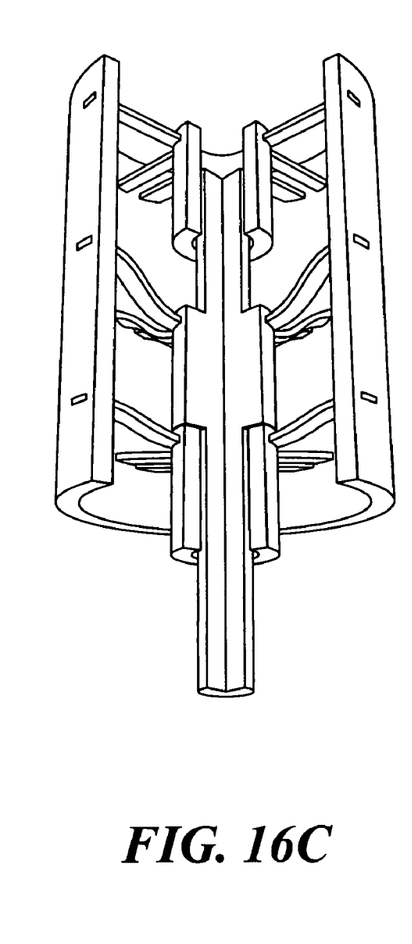
Figure 16D:
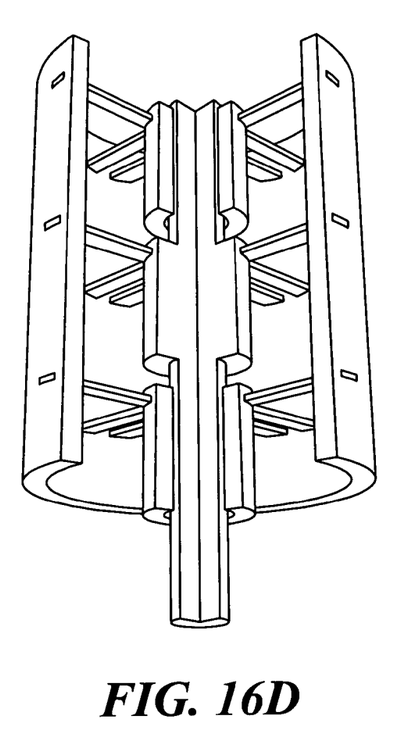
Figure 16E:
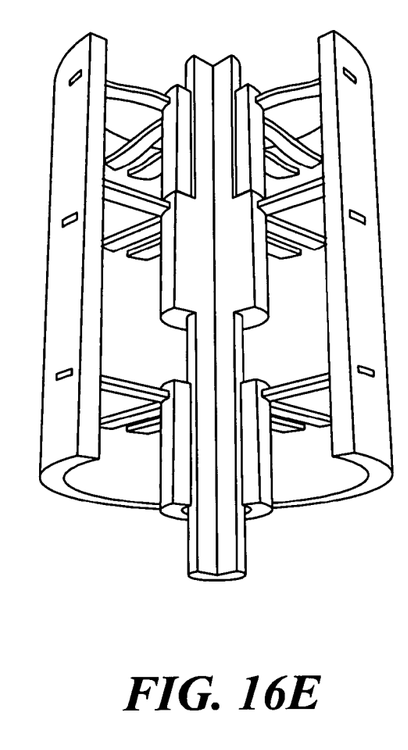

A pultrusion process can be used to manufacture SMA composite materials having a constant cross section and virtually any size and length. In pultrusion processing, the SMA wires 58 are threaded through wire guides to collimate and arrange the wires. The wires are wet out with resin in a resin bath and pulled through a heated die. The resin cures and hardens to form the matrix 54 as it is pulled through the die by shear forces exerted by the wires. See, for example, FIG. 10. A variety of cross-sectional shapes can be pultruded, such as rectangular (FIG. 2) or circular (FIGS. 10-15). A number of wire arrangements can be selected. For example, FIG. 10 illustrates an arrangement in which space between the wires and the outer surface is minimized. FIG. 11 illustrates a close-packed arrangement. FIG. 12 illustrates a central area left free of wires and replaced with a spacer tube during pultrusion. Smaller diameter wires 62 can be used to fill spaces and interstices between larger diameter wires 64 if desired. See FIGS. 13-15. A mold release peel ply can be placed over the outer surface of the pultruded shape and removed after pultrusion. Or a resin-impregnated felt 56 can be wrapped around the wire bundle to ensure the integrity of the outer surface. The felt can be left in place or removed.

To improve adhesion with the elastomeric matrix, the wires can be treated, such as with a solvent, for example, acetone, or by mechanical abrasion, or by a combination of dissolution and mechanical abrasion. Alternatively, if the wires include an oxide coating, the coating can be left in place.

In another embodiment, the connecting members can be formed by lay up in a mold. For example, individual layers of wires can be staged by holding them in tension and wetting out with a thin layer of the matrix prepolymer resin. Each wet-out layer is then placed in an oven to semi-cure the matrix material, making the layers stiffer and easier to handle. Each staged layer is then wetted with more resin and placed in a mold to obtain the desired shape and size of the connecting member. A press plate is placed over the part to give a smooth surface and to squeeze out any excess resin. The mold is placed in a hot press for a sufficient time to effect curing, for example at 250° F. for 2 to 3 hours, and under sufficient pressure to squeeze the part down to the desired thickness.

To form the dome-shaped connecting member, the wires may be held in the appropriate radial or curved configuration by, for example, tape. The wires are then placed in a mold having the domed configuration and a curable matrix material is added to the mold. Multiple layers of wires can be used if desired. The mold is compressed and heated to cure the matrix resin.

A vacuum assisted resin transfer molding (VARTM) process can also be used. The SMA wires can be placed in layers or as a bundle in a vacuum bag and resin infused therethrough under vacuum.

Although the device has been described as being formed in three pieces, the device can be formed in any number of pieces. For example, the base member, the mounting member, and the connecting member(s) can be cast or otherwise formed integrally as a single piece. Alternatively, the connecting member(s) can be cast or otherwise formed integrally with either the base member of the mounting member.

Multiple isolator devices can be provided to accommodate a variety of vibration and shock loads. Referring to FIGS. 16A-16E, in one embodiment, three isolator devices 72, 74, 76 are stacked and mounted to a central or axial support member 78. For example, the middle isolator device 74 can be tuned to mitigate general low level vibrations encountered under normal operating conditions. The upper and lower isolator devices can be tuned to mitigate shock loads or other unusually large deformations. FIGS. 16A-16E illustrate a sequential response to a shock load. It will be appreciated that any desired number of isolator devices or stages may be provided.

Figure 17:
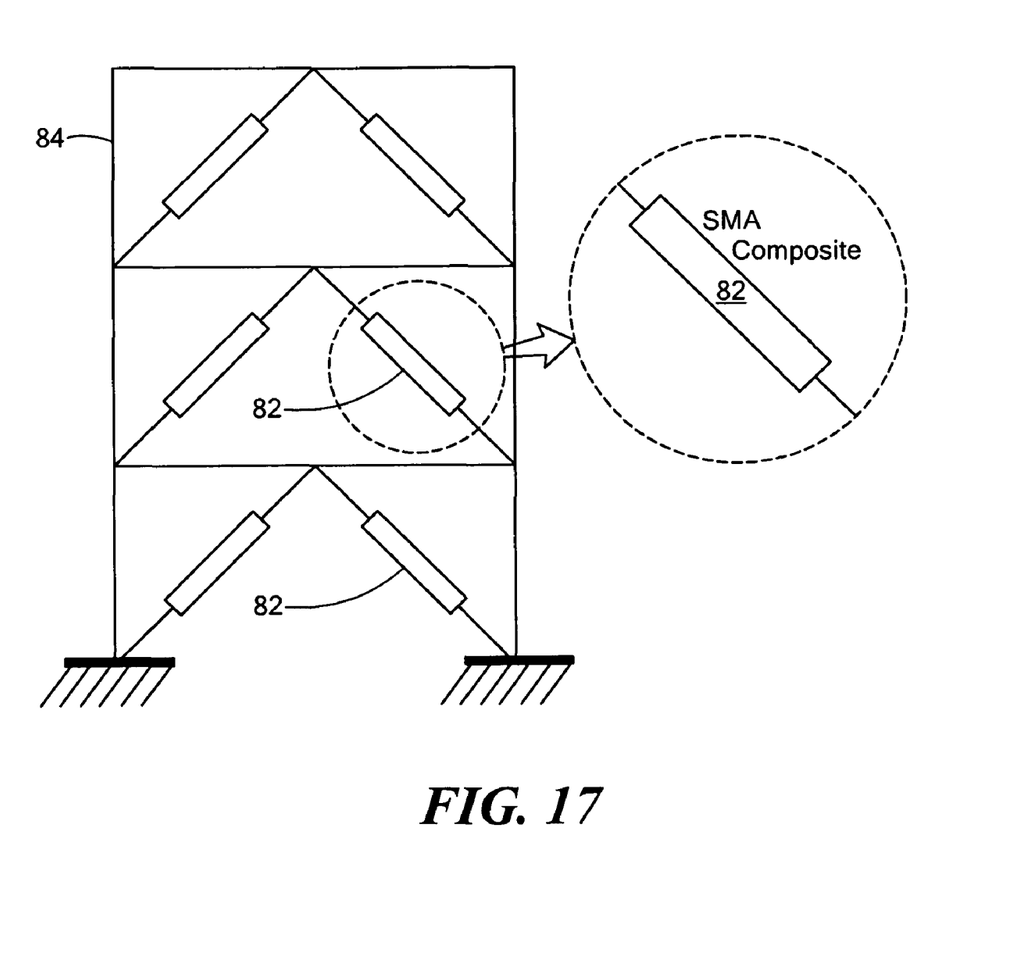
FIG. 17 is a schematic illustration of a seismic brace incorporating SMA composite material according to the invention.

In another embodiment, the SMA composite material can be incorporated into a seismic brace 82. See FIG. 17. The SMA composite material can be readily scaled to larger sizes, for example, by pultrusion of larger diameter rods. The SMA composite material rod can be suitably configured to attach to a structure, such as a steel frame building 84, for example, with fixtures (not shown) on the ends for connection to the frame of the structure. The SMA composite brace can provide reduction of inter story drift and help decrease accumulation of permanent deformation of a steel frame after a seismic event. The SMA composite brace can also provide recentering (i.e., a return to the original position after deformation)

and therefore resistance to buckling, in contrast to conventional steel braces, which buckle in compression.

Figure 18:
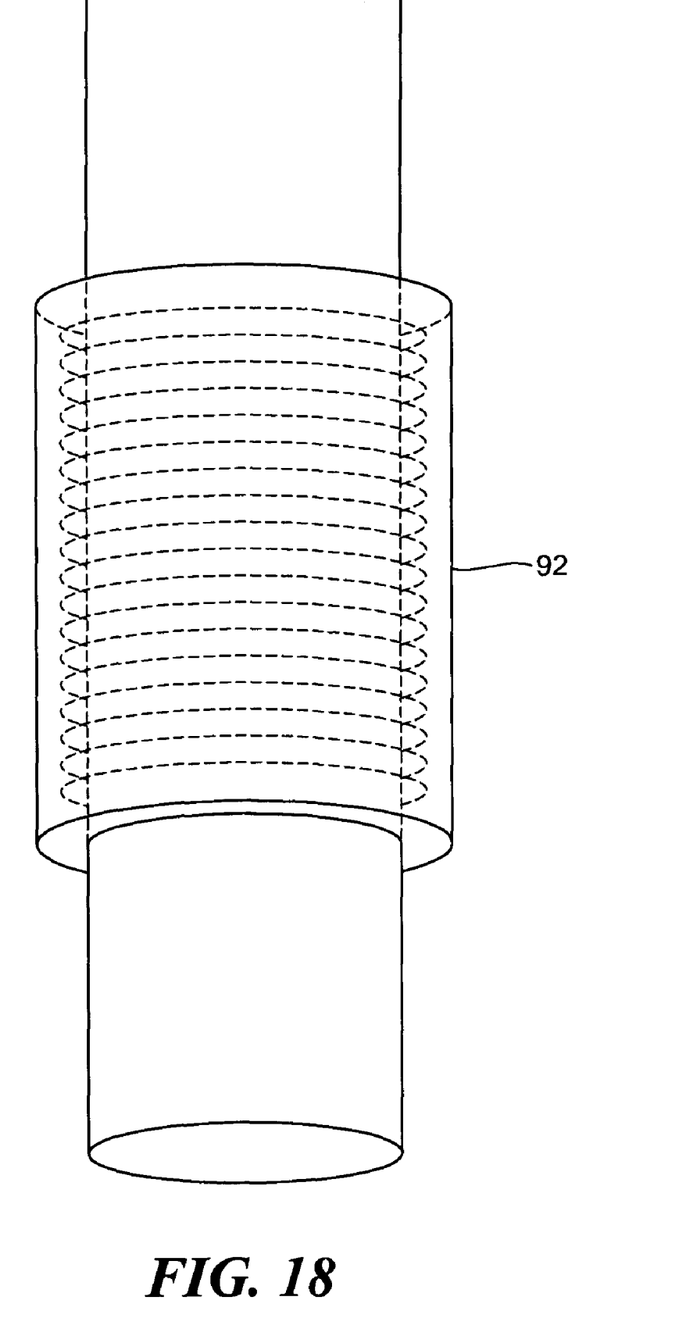
FIG. 18 is a schematic illustration of a column wrap incorporating SMA composite material according to the invention.

In another embodiment, the SMA composite material can be used as a column wrap 92 to provide resistance against blast and seismic loads. See FIG. 18.

The present invention is advantageous in a number of respects. The isolator device mitigates the unfavorable weight, cost, and space consequences imposed by prior art isolators and addresses both shock and vibration mitigation within the same isolation system. Commonality of design allows the devices to scale up to isolate large and heavy machinery or to scale down to isolate sensitive electronics equipment from unwanted shock and vibration.

The device makes use of standard, readily available SMA or superelastic wire with proven properties. The device provides scalability to virtually any size and significantly higher cost, whereas bulk SMA materials are limited in size and cost, are difficult to machine, and have unproven properties. The present invention provides the optimal volume/cost ratio by optimizing the diameter and type of SMA wire used in each composite configuration for a given application. Properties of interest can be tailored to a given application.

The device provides the ability to incorporate SMA materials into large diameter devices to provide the desired stiffness to a structure and adequate stress plateaus to limit the amount of force transferred to other members of the structure during a seismic event. Thus, the present invention makes possible the adoption of large diameter SMA materials in civil engineering applications.

The invention is not to be limited by what has been particularly shown and described, except as indicated by the appended claims.

What is claimed is:

1. A composite material comprising:
   a plurality of wires comprised of a superelastic shape memory alloy, wherein the superelastic shape memory alloy has a strain of at least 7%; and
   a matrix material comprising an elastomeric thermoset material having a strain at least as great as the elastic strain of the superelastic shape memory alloy;
   wherein the wires are longitudinally aligned and embedded within the matrix material.

2. The composite material of claim 1, wherein the superelastic shape memory alloy comprises a nickel-titanium alloy, a nickel-titanium-niobium alloy, a copper-aluminum-nickel alloy or a copper-zinc-aluminum-nickel alloy.

3. The composite material of claim 1, wherein the superelastic shape memory alloy comprises Nitinol.

4. The composite material of claim 1, wherein the elastomeric matrix material comprises a polyurethane.

5. The composite material of claim 1, having the form of a rod, strip, sheet, or dome.

* * * * *

UNITED STATES PATENT AND TRADEMARK OFFICE
CERTIFICATE OF CORRECTION

| | |
|---|---|
| PATENT NO. | : 8,053,068 B2 |
| APPLICATION NO. | : 12/080090 |
| DATED | : November 8, 2011 |
| INVENTOR(S) | : Jerome P. Fanucci et al. |

It is certified that error appears in the above-identified patent and that said Letters Patent is hereby corrected as shown below:

Column 4, line 53, "600-1000W" should read --600-1000%--.

Signed and Sealed this
Twenty-third Day of October, 2012

David J. Kappos
*Director of the United States Patent and Trademark Office*